(12) United States Patent
Spahn et al.

(10) Patent No.: US 7,866,703 B2
(45) Date of Patent: Jan. 11, 2011

(54) RE-SETTABLE VEHICLE SEAT BELT BUCKLE PRE-TENSIONER PRESENTER SYSTEM AND METHOD OF OPERATION

(75) Inventors: Brian Robert Spahn, Plymouth, MI (US); Dean M. Jaradi, Macomb, MI (US); Joseph Robert Brown, Grosse Ile, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 564 days.

(21) Appl. No.: 11/752,328

(22) Filed: May 23, 2007

(65) Prior Publication Data
US 2008/0290644 A1     Nov. 27, 2008

(51) Int. Cl.
*B60R 22/36*     (2006.01)
(52) U.S. Cl. .................................................. 280/806
(58) Field of Classification Search .............. 280/801.1, 280/801.2, 806, 807; 297/480, 481; *B60R 22/03, B60R 21/195, 22/22*
See application file for complete search history.

(56) References Cited

U.S. PATENT DOCUMENTS

| | | | | |
|---|---|---|---|---|
| 4,765,651 | A * | 8/1988 | Unger | 280/804 |
| 5,639,120 | A | 6/1997 | Kmiec et al. | |
| 5,690,356 | A * | 11/1997 | Lane, Jr. | 280/735 |
| 5,887,897 | A | 3/1999 | Gill et al. | |
| 6,460,935 | B1 * | 10/2002 | Rees et al. | 297/478 |
| 6,669,234 | B2 | 12/2003 | Kohlndorfer et al. | |
| 6,866,296 | B2 | 3/2005 | Webber et al. | |
| 6,874,817 | B2 | 4/2005 | Nakano et al. | |
| 6,883,834 | B2 * | 4/2005 | Grabowski et al. | 280/801.2 |
| 6,932,324 | B2 * | 8/2005 | Biller et al. | 254/230 |
| 6,969,088 | B2 | 11/2005 | Wang | |
| 2001/0017330 | A1 * | 8/2001 | Fujii et al. | 242/390.8 |
| 2003/0060980 | A1 * | 3/2003 | Prakah-Asante et al. | 701/301 |

(Continued)

FOREIGN PATENT DOCUMENTS

WO    WO2004054853    *   7/2004

OTHER PUBLICATIONS

Anonymous Disclosure, "Combination Precrash Pretensioner and Buckle Presenter", Feb. 2007, Reaserach Disclosure Journal, Kenneth Mason Publications Ltd. RD514026.*

*Primary Examiner*—Paul N Dickson
*Assistant Examiner*—Robert A Coker
(74) *Attorney, Agent, or Firm*—Franklin MacKenzie

(57) ABSTRACT

A re-settable vehicle seat belt pre-tensioner apparatus is disclosed having a first member engagable with a second member that is moveable relative to the first member, and re-settable in response to various sensed driving conditions to pretension the seat belt around the operator and return to a non pre-tensioned status when the driving conditions have passed. The apparatus may be operated by positioning the belt for use; determining whether the seat belt buckle is in use; locking the pre-tensioner and lowering the seat belt buckle below the seat occupation plane; determining whether a threshold vehicle seat belt pre-tension load has been met; raising the belt buckle to a design position, unlocking the retractor; determining whether a threat event is imminent and locking the retractor; lowering the vehicle seat buckle relative to the plane of occupation, determining whether a crash event is occurring, and if yes, deploying a pyrotechnic deployment to secure the occupant in the seat.

16 Claims, 5 Drawing Sheets

U.S. PATENT DOCUMENTS

| | | | |
|---|---|---|---|
| 2003/0075914 A1* | 4/2003 | Kohlndorfer et al. | 280/808 |
| 2003/0090100 A1* | 5/2003 | Webber et al. | 280/806 |
| 2003/0200019 A1* | 10/2003 | Grabowski et al. | 701/45 |
| 2003/0227166 A1* | 12/2003 | Modinger et al. | 280/806 |
| 2005/0224270 A1 | 10/2005 | Holbein et al. | |
| 2005/0269148 A1 | 12/2005 | Koide et al. | |
| 2006/0118347 A1* | 6/2006 | Zelmer et al. | 180/268 |
| 2006/0249946 A1* | 11/2006 | Bachmann et al. | 280/806 |
| 2007/0194565 A1* | 8/2007 | Clute | 280/806 |

\* cited by examiner

RE-SETTABLE VEHICLE SEAT BELT BUCKLE PRE-TENSIONER PRESENTER SYSTEM AND METHOD OF OPERATION

TECHNICAL FIELD OF THE INVENTION

The present invention relates generally to automotive occupant restraint systems, and more particularly to the construction of mechanisms for providing vehicle condition responsive presenters and re-settable pre-tensioning force to a belt buckle responsive to sensed automotive conditions such as pre-crash and crash conditions.

The present invention more particularly relates to a re-settable vehicle seat belt buckle pre-tensioner presenter to permit an operator to have easy access to a vehicle seat belt buckle when donning a seatbelt, and further to be provided with a system to provide re-settable variable pre-tensioning of a vehicle safety belt in response to sensed vehicle driving conditions such as crash and pre-crash conditions. When the pre-crash condition has passed, the belt tension returns to normal and the occupant can operate the vehicle seat belt buckle.

The present invention further relates to a method of operating a re-settable vehicle seat belt buckle pre-tensioner presenter system that presents a seat belt buckle to an occupant for easy access when donning a seatbelt so equipped, and pre-tensions the seat belt in response to perceived threat events and returns to normal tension and position once said perceived threat events have passed.

BACKGROUND OF THE INVENTION

It is well known in the automotive industry to provide pre-tensioning or belt presenting mechanisms and devices for enhancing the efficacy of occupant restraint systems that employ seat belts. These systems have generally provided for a seat belt presenter or pre-tensioner that utilizes pyrotechnic devices to activate gas ejection to provide for belt pre-tensioning during sensed crash and pre-crash conditions.

There has been a need to provide for a re-settable vehicle seat belt pre-tensioner presenter that presents a vehicle seat belt buckle to an operator for easy access, and permits variable seat belt tensioning in response to sensed vehicle driving conditions.

To improve upon existing passive and active safety technology, it has been determined that passive safety technologies should be designed and developed to utilize pre-crash sensor signals to provide active safety feature benefits. Re-settable seat belt pre-tensioners are known in the art. However there is a continuing challenge to develop a re-settable seat belt pre-tensioner to provide active and passive safety benefits through the use of pre-crash sensors to pre-tension the belt during pre-crash and crash events. In addition, most re-settable seat belt pre-tension systems are incorporated into the retractor portion of the seat belt system. In addition, more convenient seat belt systems to aid in donning the seatbelt will be an aid in ensuring that a greater number of drivers wear seat belt restraints. Accordingly, it is felt that a seat belt buckle pre-tensioner presenter with active and passive safety features will be an improvement to vehicle seat belt restraint systems.

BRIEF SUMMARY OF THE INVENTION

In one aspect, the present invention is a re-settable vehicle seat belt buckle pre-tensioner presenter apparatus, comprising a first member moveable relative to a second member the first member may be capable of receiving a seat belt tongue insert; and the second member may be driveably connected to a variable reversible drive motor. The apparatus may be further equipped with a re-settable seat belt buckle and belt pre-tensioner adjustor. The adjustor may be adapted to adjust the seat belt buckle to a desired position relative to the seat to facilitate easy access by an operator. The seat belt buckle and belt pre-tensioner adjustor may further act as a re-settable seat belt pre-tensioner in response to various sensed driving condition inputs to resettably pre-tension the seat belt around an operator during pre-crash and crash conditions, and returning to non pre-tension status when the pre-crash conditions have passed.

In another embodiment, the apparatus comprises a first member having a hollow body along substantially its length. The first body is equipped with at least one anchorage to facilitate fixing the first body in a vehicle proximal a seat. The apparatus also includes a second member having a body adjustably insertable in the first member at a first end thereof. The second member is equipped with a seat belt buckle at a second end distal the first end. The apparatus further includes a re-settable seat belt buckle and belt pre-tensioner adjustor the adjustor may be adapted to adjust the seat belt buckle to a desired position relative the seat to facilitate easy access by an operator. The seat belt buckle and belt pre-tensioner adjustor may further act as a re-settable seat belt pre-tensioner in response to various sensed driving condition inputs to resettably pre-tension the seat belt around an operator during pre-crash and crash conditions, and return to non pre-tension status when the pre-crash conditions have passed.

The apparatus as set forth above further includes a variable high speed reversible electric motor engagable with the second member to actuate the second member longitudinally within the first member a fixed distance to present the seat buckle for access by an operator in response to various sensed conditions, and to variably pre-tension the vehicle seat belt in response to various sensed driving conditions to resettably pre-tension the seat belt around the operator during pre-crash conditions, and return to a non pre-tensioned state after the pre-crash conditions have passed.

The present application further includes a method for operating a re-settable vehicle seat belt buckle pre-tensioner presenter system. The method may include determining when operator opens a vehicle door; presenting the vehicle seat belt buckle for access by the operator; determining whether the operator utilizes the vehicle seat belt buckle to latch the seat belt into the buckle; determining whether a load threshold is met on the vehicle seat belt; determining whether a threat event will occur; adjusting the vehicle seat belt buckle pre-senter to adjust tension of said vehicle seat belt.

The method may further include adjusting the vehicle seat belt buckle when it is determined that the vehicle seat belt load threshold has not been met.

The vehicle seat belt may be pre-tensioned in response to at least one of brake pressure; brake pedal position; steering wheel angle; chassis longitudinal and latitudinal acceleration; vehicle roll rate; vehicle wheel speed, radar and various other pre-crash sensor signals.

The method may further include determining vehicle seat belt buckle status and the vehicle seat belt load.

The present invention further relates to a method for operating a re-settable vehicle seat belt buckle pre-tensioner presenter system, comprising:

a) determining whether a vehicle door is opened;
b) raising said seat belt buckle above a plane of occupation of a vehicle seat for access by an occupant;

c) determining whether said occupant has buckled said seat belt into said buckle;
d) locking a seat belt retractor;
e) lowering said seat belt buckle below said plane of occupation of a vehicle seat to pre-tension said belt around the occupant;
f) determining whether a threshold vehicle seat belt pre-tension load has been met;
g) raising said seat belt buckle to a design position;
h) unlocking said retractor;
i) determining whether a threat event is imminent;
j) locking said retractor;
k) lowering said vehicle seat belt buckle relative to said plane of occupation until a second pre-tension threshold load has been met;
l) determining whether a crash event is occurring;
m) deploying a pyrotechnic seatbelt pre-tensioner to secure the occupant in the seat; and
n) unlocking the retractor.

The threat event may be determined by sensing at least one of vehicle brake pressure; vehicle brake pedal position; steering wheel angle; chassis longitudinal and latitudinal acceleration; vehicle roll rate, vehicle wheel speed, radar and various other pre-crash sensor signals.

DETAILED DESCRIPTION OF THE PREFERRED EMBODIMENT(S)

Figure 1:
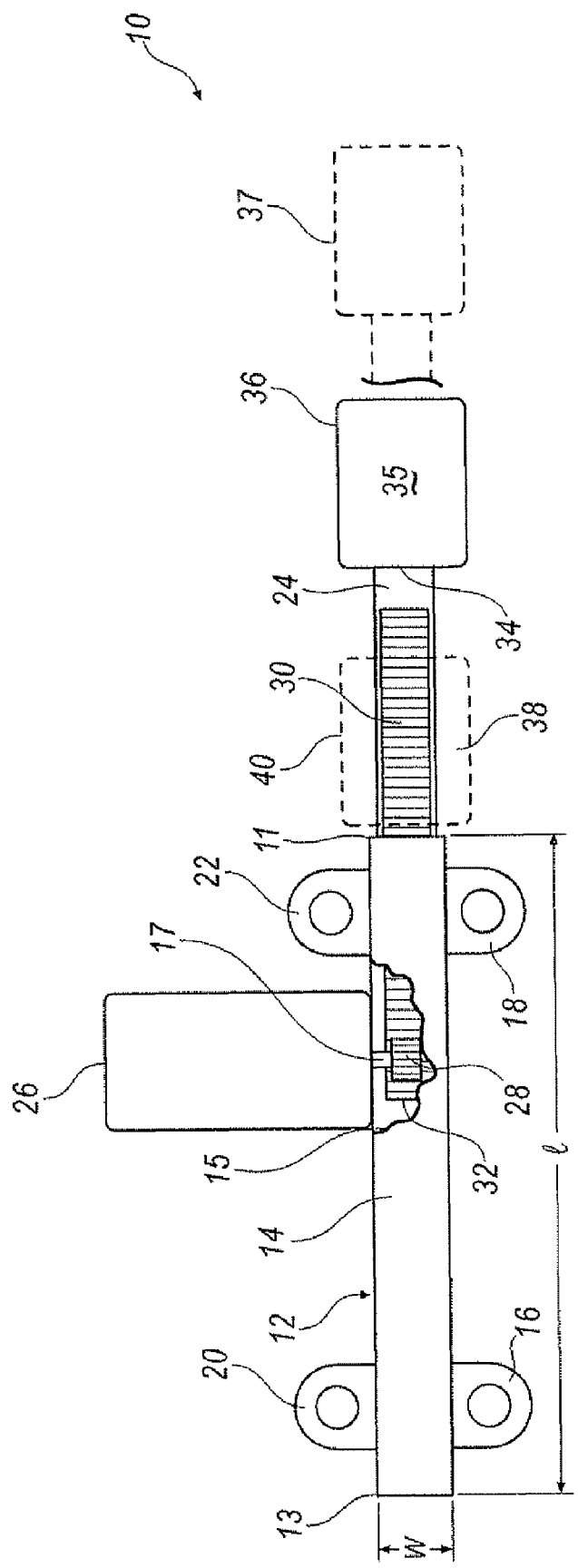
FIG. 1 is a schematic overview representation of one embodiment of the re-settable vehicle seat belt buckle pre-tensioner presenter system of the present invention.

Turning now to the drawings, wherein like numbers refer to like structures, and particularly to FIG. 1, there is depicted a schematic overview of the re-settable vehicle seat belt buckle pre-tensioner presenter of the present invention. Specifically, the re-settable vehicle seat belt buckle pre-tensioner presenter mechanism 10 is comprised of a first hollow member 12 that has a body 14 with a length 1, and a width w that is less than 1 to define an elongated first hollow member. The first hollow member has opposing first and second ends 11 and 13 respectively. The first member may be equipped with at least one, and preferable more than one attachment anchors 16, 18, 20 and 22 arranged along the length of the first hollow member such that the first hollow member may be securely anchored to a vehicle body structure or seat frame according to the design requirements of the vehicle. A second member 24 is adjustably insertable in said first hollow member. The second member has a length that may be greater than, the same or less than the length of the first hollow member, and a width that is slightly less that the width of the first hollow member. Preferably, the second member is of rigid construction such that it can be inserted into the first hollow member and be adjustable moveable within and relative to the first hollow member. This adjustable movement is accomplished by a high speed motor 26 that is mounted in close proximity to, and preferably on, said first hollow member and interacts with the second member to adjust the position of the second member relative to the first hollow member in response to various commands. As seen in the cutaway portion 15 of first hollow member 12, the motor has a pinion gear 28 mounted on the armature 17 of the motor that interacts with a toothed rack 30 on the second member as a rack and pinion arrangement to accomplish the movement. Other mechanisms to actuate the adjustment of the second member relative to the first member may also include pressure roller mechanisms, cable feeds and the like to adjust the second member relative to the first member. Indeed, those skilled in the art recognize that any suitable mechanism to adjust the second member relative to the first member may be included in the description set forth here. The second member has a first end 32 that is insertable into the first hollow member, and a second end 34 that is equipped with a seat belt buckle 35 of any conventional design. The motor, which is preferably a reversible variable speed motor, is electrically connected to a variety of sensors and the vehicle battery as will be more fully described in relation to FIG. 2, adjustably moves the second member relative to the first member such that the buckle may be moved from a design position 36 to a presented position 37 and a pre-tensioned position 38, depending upon the various stages in the method of operation of the re-settable vehicle seat belt buckle pre-tensioner presenter of the present invention. It can be understood by those skilled in the art that when the buckle is moved from the design position to the presented position, motor 26 is energized and armature 17 rotates the pinion gear 28, which cooperatively engages toothed rack 32 to move the second member distally relative to the first hollow member. Usually, the second member is extended distally from the first member so that the buckle is extended about 100 mm from the design position to the presented position. When the buckle is in the presented position, it is above a plane of occupation of a vehicle seat for easy access by an operator of the belt buckle, as can be seen by reference to FIG. 3. After the seat belt tongue is inserted into the buckle, the second member is moved proximally relative to the first member by rotation of the pinion gear in a direction opposite to the direction of rotation when the buckle is moved to the presented position so that the second member is cooperatively moved into the first hollow member body 14 so that the second member is moved within the first member and the buckle is moved to the pre-tensioned position 38, as shown in FIGS. 1 and 3.

Figure 2:
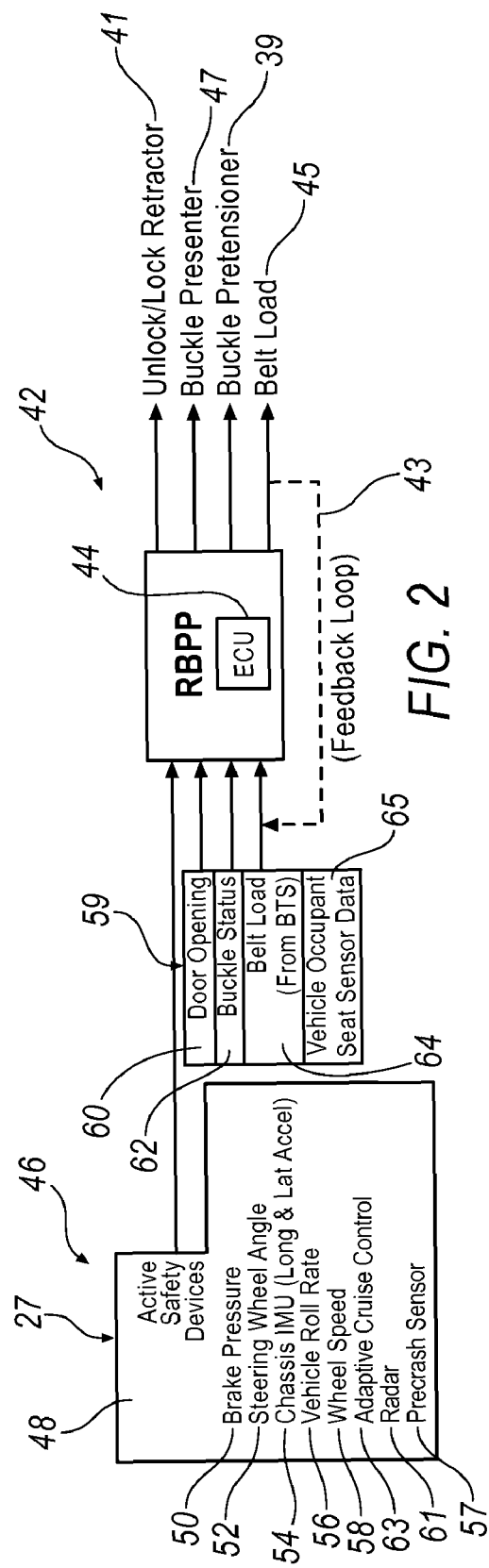
FIG. 2 is a schematic block diagram of one embodiment of the re-settable vehicle seat belt buckle pre-tensioner presenter system of the present invention.
Figure 3:
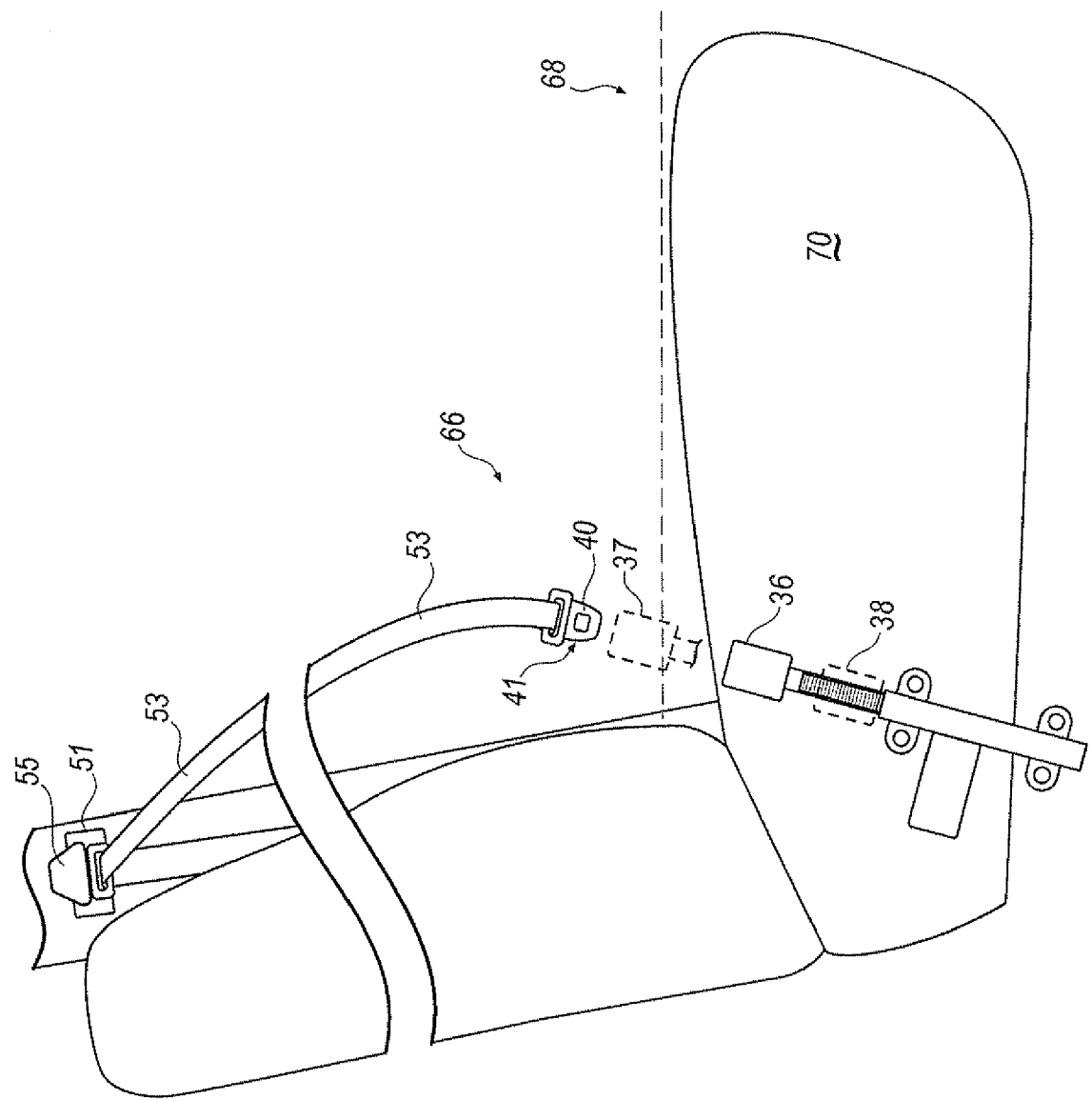
FIG. 3 is a schematic representation of the re-settable vehicle seat belt buckle pre-tensioner presenter of the present invention with a vehicle seat showing the plane of occupation.

Having thus described the movement of the second member relative to the first member to move the buckle from a design position distally to a presented position and proximally to a pre-tensioned position, FIG. 2 is a is a schematic block diagram of the re-settable vehicle seat belt buckle pre-tensioner presenter system of the present invention, showing inputs to and outputs from the Re-settable Buckle Pre-tensioner Presenter.

Specifically, the system 42 is electronically connected to the ECU 44. Various threat alerts 46 are includable in the active safety devices 48. The threat events may include brake pressure 50, steering wheel angle 52, chassis longitudinal and latitudinal acceleration 54, vehicle roll rate 56, activation of adaptive cruise control 63, radar 61, pre-crash sensors 57, and wheel speed 58. These active safety devices generate data signals and are all input by sensors to the ECU to be processed as driving conditions and used to actuate the re-settable vehicle seat belt buckle presenter pre-tensioner in a manner to be hereinafter described. The seat belt assembly 41, as seen in FIG. 3, is equipped with a tongue 40 insertable into the buckle in a conventional manner. The seatbelt retractor is further equipped with an accelerometer or other suitable sensor 45 that actuates a solenoid or other suitable brake 51 upon excitation of the accelerometer or other suitable sensor to prevent the shoulder portion 53 of the harness from continuously reeling out during impact or during pre-tensioning of the belt. Specifically, during desired events such as pre-tensioning or during crash, the accelerometer or other sensor activates a solenoid that locks and unlocks the retractor of the shoulder harness as schematically represented at 45. This may be accomplished in a number of ways conventional in the art, such as, for example by a plunger that prevents the reeling of the shoulder harness during desired events such as pre-tensioning and crash events.

Additional sensed events are the state of the vehicle 59, which includes door opening 60, belt buckle status 62, and belt pretension load 64 and vehicle seat sensor data 65. The vehicle seat sensor data is understood to be data from seat sensors determinative of whether the seat is occupied, the weight of the occupant, etc, such as is well known in the art for vehicle seat sensor data. These sensed event are known collectively as the vehicle occupant safety data. The input of all these parameters is determinative in the operation of the mechanism described in FIG. 1. The ECU then activates the buckle presenter 47 and the buckle pre-tensioner in response to input from the threat alerts as well as the state of the vehicle 59. Note that a feedback loop 43 exists between the belt load input and the belt load exerted 45. The belt load may change when a threat event is sensed, whereupon the belt tension is increased in anticipation of a threat. The threats and vehicle states are transmitted to the ECU by means of sensors as is well known to those of ordinary skill in the art.

FIG. 3 is a representation of a vehicle seat equipped with the vehicle seat belt buckle pre-tensioner presenter of the present invention. Specifically, vehicle seat 66 has a plane of occupation 68 that is above the vehicle seat cushion 70. The buckle is activated to rise above the plane of occupation when the vehicle door is opened, or when the occupant unbuckles the seatbelt. The buckle is in the presented position, and it extends above the plane of occupation to allow for easy access by an operator. Once the seat belt tongue is locked into the buckle, the buckle lowers to remove excess seatbelt slack and then rises into the design position. In response to a threat condition, the buckle is retracted to a pre-tensioned positioned until the threat has passed. After the threat has passed, the buckle returns to the design position.

Figure 4:
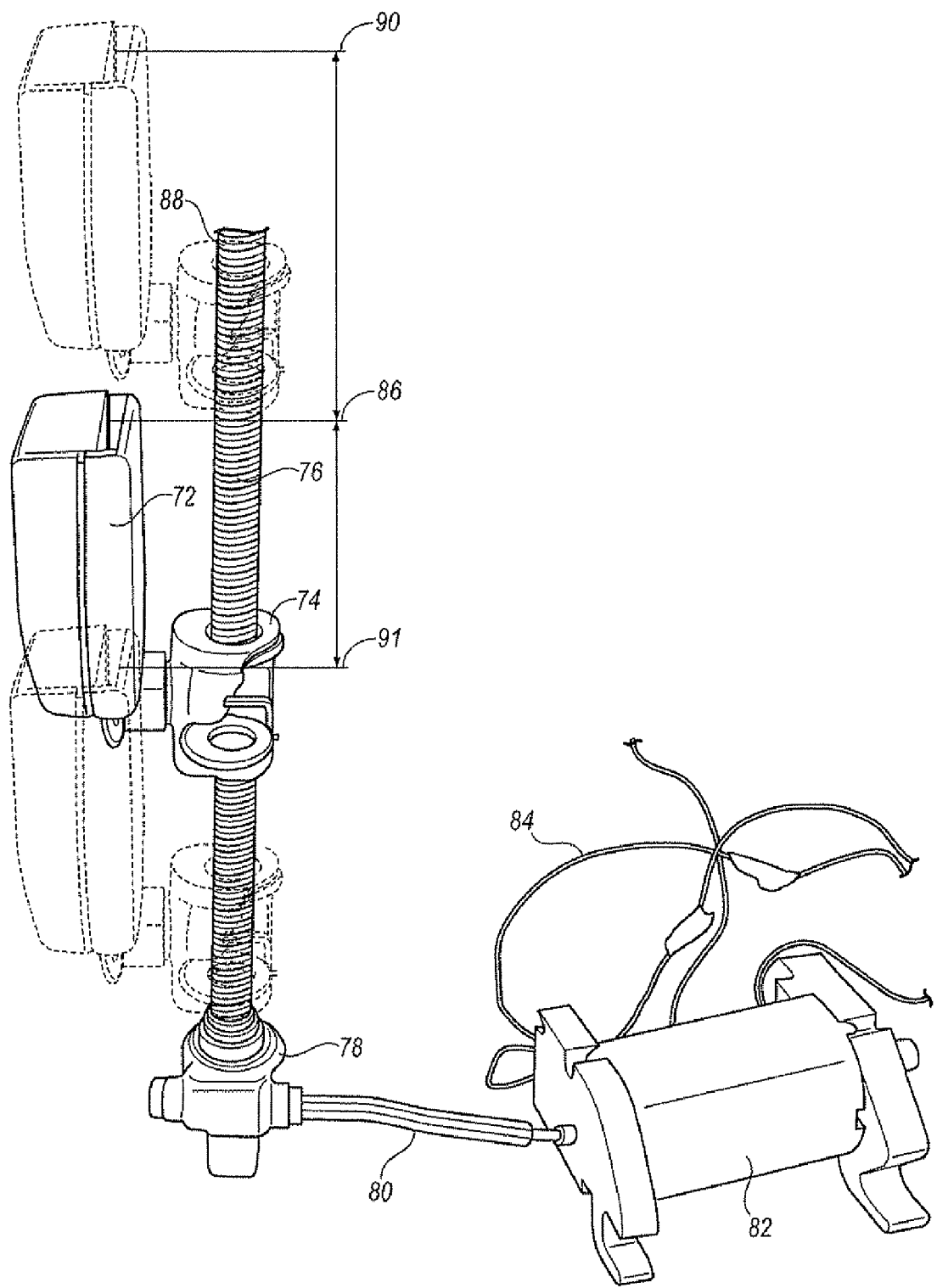
FIG. 4. is a schematic representation of another embodiment of the re-settable vehicle seat belt buckle pre-tensioner presenter system of the present invention.

FIG. 4 is a representation of another embodiment of the present invention. Specifically, a second member shown as buckle 72 is affixed to a carrier nut 74 that is cooperatively threaded on a first member, shown as a drive screw 76 that in turn is driveably connected to a worm gear 78 that is equipped with a drive shaft 80 powered by an electric motor 82. The electrical motor is preferably a variable speed motor that is reversible so that the drive screw may be rotated in one direction to present the buckle and rotated in an opposite direction to retract the buckle in a manner to be hereinafter described. The electric motor is electrically connected to a power source, such as the vehicle battery or other power source by electrical connector 84. The drive screw is of sufficient length to permit movement of the buckle throughout the desired range of motion. In this regard, the buckle is initially parked in the design position 86. When the vehicle door is opened, the motor is engaged and the driveshaft turns the worm gear in one direction to rotate the drive screw. The carrier nut cooperatively engages the threads 88 on the drive screw and rides the threads to the presented position 90. The occupant then engages the seat belt tongue into the buckle. When the buckle engages a seat belt tongue, a circuit is completed and the motor is engaged to rotate the drive screw in an opposite direction to retract the buckle from the presented position to the pre-tension position 91. When the desired pre-tension position is detected, the motor is engaged to rotate the drive screw to raise the buckle back to the design position. The presenter pre-tensioner system is then ready to operate according to the needs of the vehicle and driver as set forth in reference to FIG. 5.

Figure 5:
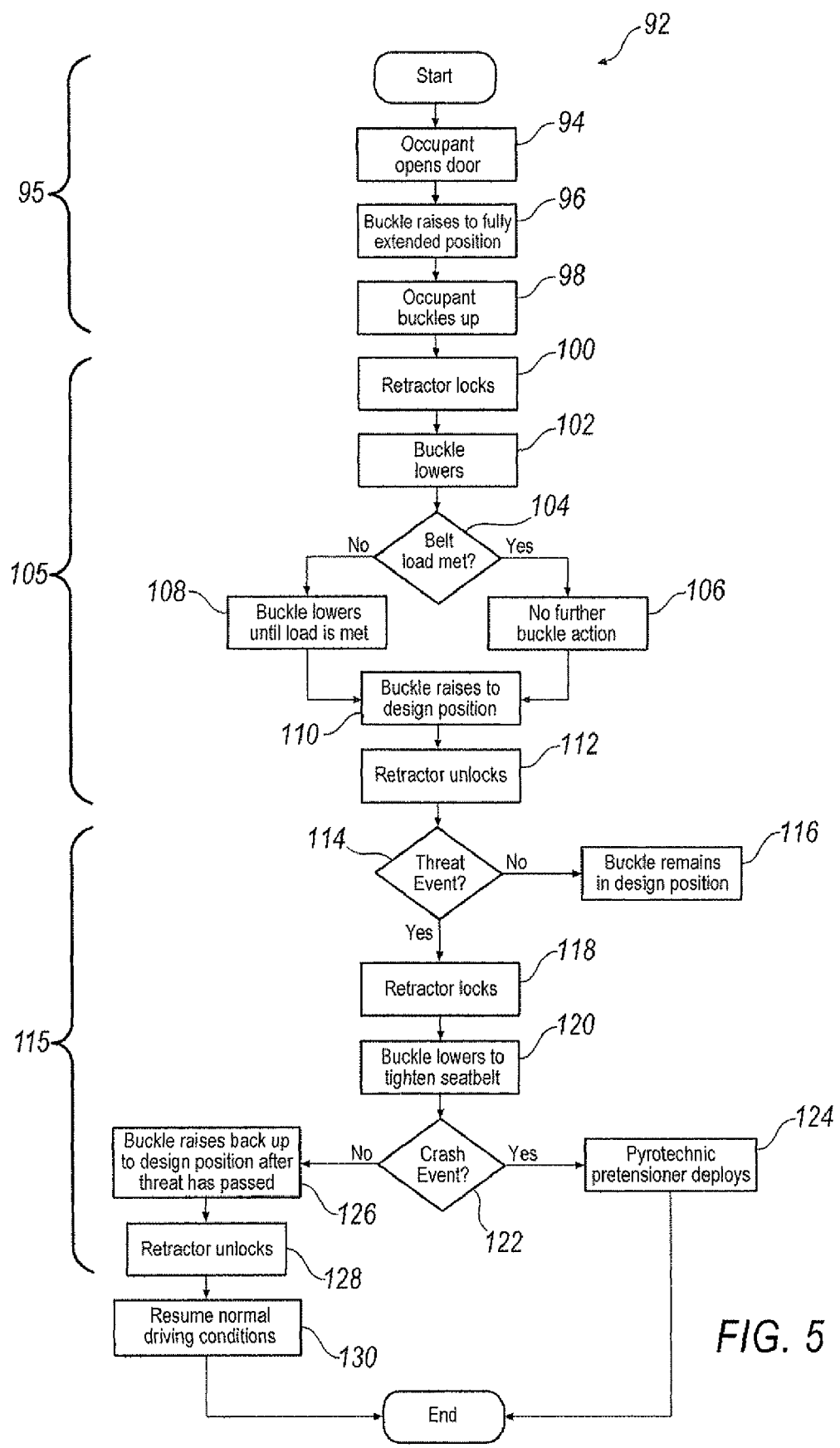
FIG. 5 is a flowchart showing a method of the present invention.

Having thus described the movement of the second member relative to the first member to move the buckle from a design position distally to a presented position and proximally to a pre-tensioned position, FIG. 5 is a representation of a method of operating the re-settable vehicle seat belt buckle pre-tensioner presenter of the present invention. Specifically, method 92 begins with step 94, which is determining whether a vehicle door is opened. If the door is opened, step 96 is raising the seat belt buckle above a plane of occupation of a vehicle seat to an extended position for access by an occupant. Step 98 is buckling said seat belt into said buckle. The steps described from reference numeral 94 through 98 can be described as comprising presenting the buckle and designated as step 95. In any event, after the buckle has been presented, Step 100 is locking the seat belt harness retractor. Step 102 is lowering the seat belt buckle below said plane of occupation of a vehicle seat to pre-tension said belt around the occupant. Step 104 is determining whether a threshold vehicle seat belt pre-tension load has been met. If yes, Step 106 is no further action on belt buckle load. If the determination in step 104 is no, step 108 is lowering the belt buckle until a pre-tension threshold is met. The next step from both step 106 and 108 is step 110, raising the seat belt buckle to a design position. Step 112 is unlocking the seat belt retractor. The steps 100 through 112 may be described as removing initial seat belt slack 105. After the initial slack is removed from the seat belt, Step 114 is determining whether a threat event is imminent. If no, step 116 is the buckle remains in a design position. If yes, Step 118 is locking the seat belt harness retractor. Step 120 is lowering the vehicle seat belt buckle relative to the plane of occupation until a second pre-tension threshold load has been met. Step 122 is determining whether a crash event has occurred. If yes, step 124 is deploying a pyrotechnic pre-tensioner to further secure the occupant in the seat by means of the seat belt harness. If the determination in step 122 is no, Step 126 is raising the vehicle seat belt buckle relative said plane of occupation after the threat event has occurred to its design position. Step 128 is unlocking the retractor. Steps 114 through 128 may be designated together as step 115, which is pre-tensioning the seat belt.

Thus, as described herein, the method of the present invention may be also described as presenting the buckle for access by an operator 95, initially removing slack 105 after the seat belt has been secured into the buckle, pre-tensioning the seat belt 115 in response to perceived threat events.

The words used herein are understood to be words of description and not words of limitation. Those skilled in the art will recognize that many modification and variations are possible without departing from the scope and spirit of the invention as forth in the appended claims.

What is claimed as new and desired to be protected by Letters Patent of the United States is:

1. A re-settable vehicle seat belt pre-tensioner presenter apparatus, comprising:

a first member engaged with a second member moveable relative to said first member; said second member capable of receiving a seat belt tongue insert; said first member driveably connected to a variable reversible drive motor; said apparatus further equipped with a re-settable seat belt buckle and the drive motor also acting as a belt pre-tensioner adjustor; said adjustor adapted to adjust said seat belt buckle to a desired position relative a seat to facilitate easy access by an operator; said seat belt buckle and belt pre-tensioner adjustor further acting as a re-settable seat belt pre-tensioner in response to various sensed driving condition inputs to resettably pre-tension said seat belt around said operator during pre-crash and crash conditions, and return to non pre-tension status when said pre-crash conditions have passed.

2. The re-settable vehicle seat belt pre-tensioner presenter of claim 1, wherein said first member is variably moveable from a design position to a presented position to a pre-tension position in response to various sensed vehicle conditions.

3. The re-settable vehicle seat belt buckle pre-tensioner presenter of claim 1, wherein said pre-tensioner is disabled when a child seat is sensed in said seat.

4. The re-settable vehicle seat belt buckle pre-tensioner presenter, of claim 1, wherein:
   said first member has a hollow body along substantially its length, said first body equipped with at least one anchorage to facilitate fixing said first body in a vehicle proximal a seat; and
   said second member has a body adjustably insertable in said first member at a first end thereof; said second member having a seat belt buckle at a second end distal said first end.

5. The re-settable vehicle seat buckle pre-tensioner presenter of claim 1, wherein said re-settable seat belt presenter and belt pre-tensioner adjustor is comprised of a variable speed reversible electric motor engagable with said second member to actuate said second member longitudinally within said first member a fixed distance to present said seat buckle for access by said operator, and a variable distance in response to various sensed driving conditions to re-settably pre-tension said seat belt around said operator during pre-crash and crash conditions, and return to non pre-tensioned state after said pre-crash conditions have passed.

6. The re-settable vehicle seat belt buckle pre-tensioner presenter of claim 1, wherein said motor is equipped with a gear cooperatively engagable with a toothed rack on said second member to move said second member relative to said first member.

7. The re-settable vehicle seat belt buckle pre-tensioner presenter of claim 1, wherein said seat belt buckle is adjusted from a design position to a pre-tensioned position in response to various sensed vehicle conditions.

8. The re-settable vehicle seat belt buckle pre-tensioner presenter of claim 1, wherein said seat belt buckle is adjusted from a design position to a presented position when said operator first enters said vehicle to make said buckle more accessible to said operator; said buckle returning to said design position when operator inserts a seat belt tongue in said buckle.

9. The re-settable vehicle seat belt buckle pre-tensioner presenter of claim 1, wherein said seat belt buckle is adjusted from a design position to a presented position in response to a sensed vehicle gear position to make said belt more accessible to said operator; said buckle returning to said design position when operator inserts a seat belt tongue in said buckle.

10. The re-settable vehicle seat belt buckle pre-tensioner presenter of claim, wherein said buckle is adjusted 100 mm distally from a design position to a presented position.

11. The re-settable vehicle seat belt buckle pre-tensioner presenter of claim 1, wherein said buckle is adjusted proximally from a design position to a pre-tensioner condition.

12. The re-settable vehicle seat belt buckle pre-tensioner presenter of claim 1, wherein said buckle is adjusted 80 mm proximally to pre-tension said belt.

13. The re-settable vehicle seat belt buckle pre-tensioner presenter of claim 1, wherein said sensed driving condition inputs include brake pedal pressure, vehicle occupant safety data, vehicle longitudinal and lateral acceleration, vehicle deceleration, vehicle seat sensors, adaptive cruise control, radar and pre-crash sensor signals.

14. The re-settable vehicle seat belt buckle pre-tensioner presenter of claim 1, further including a retractor lock to secure the pre-tensioner into a retracted position during the pre-crash and crash events, and release the belt after the pre-crash events have elapsed.

15. The re-settable vehicle seat belt buckle pre-tensioner presenter of claim 1, further including a retractor lock to prevent the seatbelt webbing from paying out of the retractor during pre-tensioning of initial slack removal, pre-crash and crash events.

16. The re-settable vehicle seat belt buckle pre-tensioner presenter of claim 15, wherein said retractor lock is a solenoid.

* * * * *